United States Patent
Dutson et al.

(10) Patent No.: US 12,548,315 B2
(45) Date of Patent: Feb. 10, 2026

(54) VISION TRANSFORMERS LEVERAGING TEMPORAL REDUNDANCY

(71) Applicant: Wisconsin Alumni Research Foundation, Madison, WI (US)

(72) Inventors: Matthew Dutson, Middleton, WI (US); Yin Li, Madison, WI (US); Mohit Gupta, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 315 days.

(21) Appl. No.: 18/469,418

(22) Filed: Sep. 18, 2023

(65) Prior Publication Data

US 2025/0095349 A1 Mar. 20, 2025

(51) Int. Cl.
*G06V 10/00* (2022.01)
*G06V 10/82* (2022.01)
*G06V 10/86* (2022.01)

(52) U.S. Cl.
CPC .............. *G06V 10/82* (2022.01); *G06V 10/86* (2022.01)

(58) Field of Classification Search
CPC .... G06V 10/82; G06V 10/761; G06V 10/762; G06V 10/764; G06V 10/765; G06N 20/00; G06N 20/10; G06N 20/20
See application file for complete search history.

(56) References Cited

U.S. PATENT DOCUMENTS

| | | | |
|---|---|---|---|
| 10,747,962 B1* | 8/2020 | Fuerstenau | G06N 3/08 |
| 10,789,427 B2* | 9/2020 | Shazeer | G06F 18/10 |
| 11,169,786 B2* | 11/2021 | Badlani | G06F 8/75 |
| 11,544,943 B1* | 1/2023 | Rimchala | G06V 10/82 |
| 11,562,142 B2* | 1/2023 | Nijkamp | G06F 40/35 |
| 11,605,159 B1* | 3/2023 | Do | G06N 3/0464 |
| 11,948,378 B2* | 4/2024 | Dey | G06V 10/82 |
| 12,293,159 B1* | 5/2025 | Chan | G06F 40/40 |
| 12,354,011 B2* | 7/2025 | Biswas | G06N 3/044 |
| 12,380,676 B2* | 8/2025 | Sikka | G06V 10/764 |

(Continued)

OTHER PUBLICATIONS

Dutson et al., "Event Neural Networks," (2022) ECCV 2022: Proceedings of the European Conference on Computer Vision.

(Continued)

*Primary Examiner* — Amir Alavi
(74) *Attorney, Agent, or Firm* — Andrus Intellectual Property Law, LLP

(57) ABSTRACT

Methods and systems for processing frame data are disclosed. The methods and systems include: obtaining a sequence of data, the sequence comprising at least a first frame; applying the sequence of data to a machine learning model; and providing an inference result based on the machine learning output score from the machine learning model. The machine learning model is configured to: determine at least one token-level error based on a difference between at least one token of a first representation corresponding to the first frame and a second representation; perform a first transformer operation based on the token subset to produce an output representation corresponding to the token subset; scatter the output representation to a buffer representation corresponding to the first representation; and produce a machine learning output score based on the buffer representation. Other aspects, embodiments, and features are also claimed and described.

20 Claims, 12 Drawing Sheets

(56) References Cited

U.S. PATENT DOCUMENTS

2012/0320978 A1* 12/2012 Ameres ............... H04N 19/52
 375/E7.243
2025/0095349 A1* 3/2025 Dutson ............... G06V 10/86

OTHER PUBLICATIONS

Fayyaz et al., "Adaptive Token Sampling for Efficient Vision Transformers," arXiv:2111.15667v3 [cs.CV] Jul. 26, 2022.

Habibian et al., "Skip-Convolutions for Efficient Video Processing," CVPR 2021: Proceedings of the IEEE/CVF Conference on Computer Vision and Pattern Recognition.

Li et al., "Spatio-Temporal Gated Tranformers for Efficient Video Processing," Machine Learning for Autonomous Driving Workshop at the 35th Conference on Neural Information Processing Systems (NeurIPS 2021), Sydney, Australia.

Parger et al., "DeltaCNN: End-to-End CNN Inference of Sparse Frame Differences in Videos," CVPR 2022: Proceedings of the IEEE/CVF Conference on Computer Vision and Pattern Recognition.

Wang et al., "Efficient Video Transformers with Spatial-Temporal Token Selection," arXiv:2111.11591v2 [cs.CV] Jul. 16, 2022.

* cited by examiner

VISION TRANSFORMERS LEVERAGING TEMPORAL REDUNDANCY

STATEMENT OF GOVERNMENT SUPPORT

This invention was made with government support under 1943149 awarded by the National Science Foundation. The government has certain rights in the invention.

CROSS-REFERENCE TO RELATED APPLICATION(S)

N/A

TECHNICAL FIELD

The technology discussed herein relates generally to image or video recognition. In some respects, certain embodiments may offer improved ability to utilize certain classes of neural networks for processing images.

BACKGROUND

Machine learning 'transformers' comprise a class of neural network tools originally designed for sequence modeling in natural language processing. Embodiments of these tools first applied the concept of 'self-attention', which distinguished them from previous neural network architectures like RNNs and LSTMs. However, one of the drawbacks of attempting to utilize transformers for tasks other than natural language processing, such as computer vision-related tasks, is the high computational cost of the transformers. And, the issues associated with high computational cost are particularly exacerbated in scenarios where processing must be done in a computationally-sparse scenario (such as a mobile device, for example), when realtime processing is needed, and when the size of image/video files to be processed is large.

As the demand for computer vision tasks continues to increase, corresponding needs arise for additional capabilities in machine learning models to perform such tasks. While transformers offer interesting capabilities, as of yet they have not been readily adaptable to such tasks given their drawbacks.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method, a system, and/or an apparatus for processing frame data is disclosed. The method, the system, and/or the apparatus includes: obtaining a sequence of data, the sequence comprising at least a first frame; applying the sequence of data to a machine learning model; and providing an inference result based on the machine learning output score from the machine learning model. The machine learning model is configured to: determine at least one token-level error based on a difference between at least one token of a first representation, corresponding to the first frame, and a second representation, the first representation comprising a plurality of first tokens; select a token subset of the first representation based on the at least one token-level error; perform a first transformer operation based on the token subset to produce an output representation corresponding to the token subset; scatter the output representation to a buffer representation corresponding to the first representation; and produce a machine learning output score based on the buffer representation.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

DETAILED DESCRIPTION

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts and embodiments described herein may be implemented and practiced without these specific details. In some instances, well-known structures and components are shown in block diagram form to avoid obscuring such concepts.

Example Hardware Systems

Figure 1:
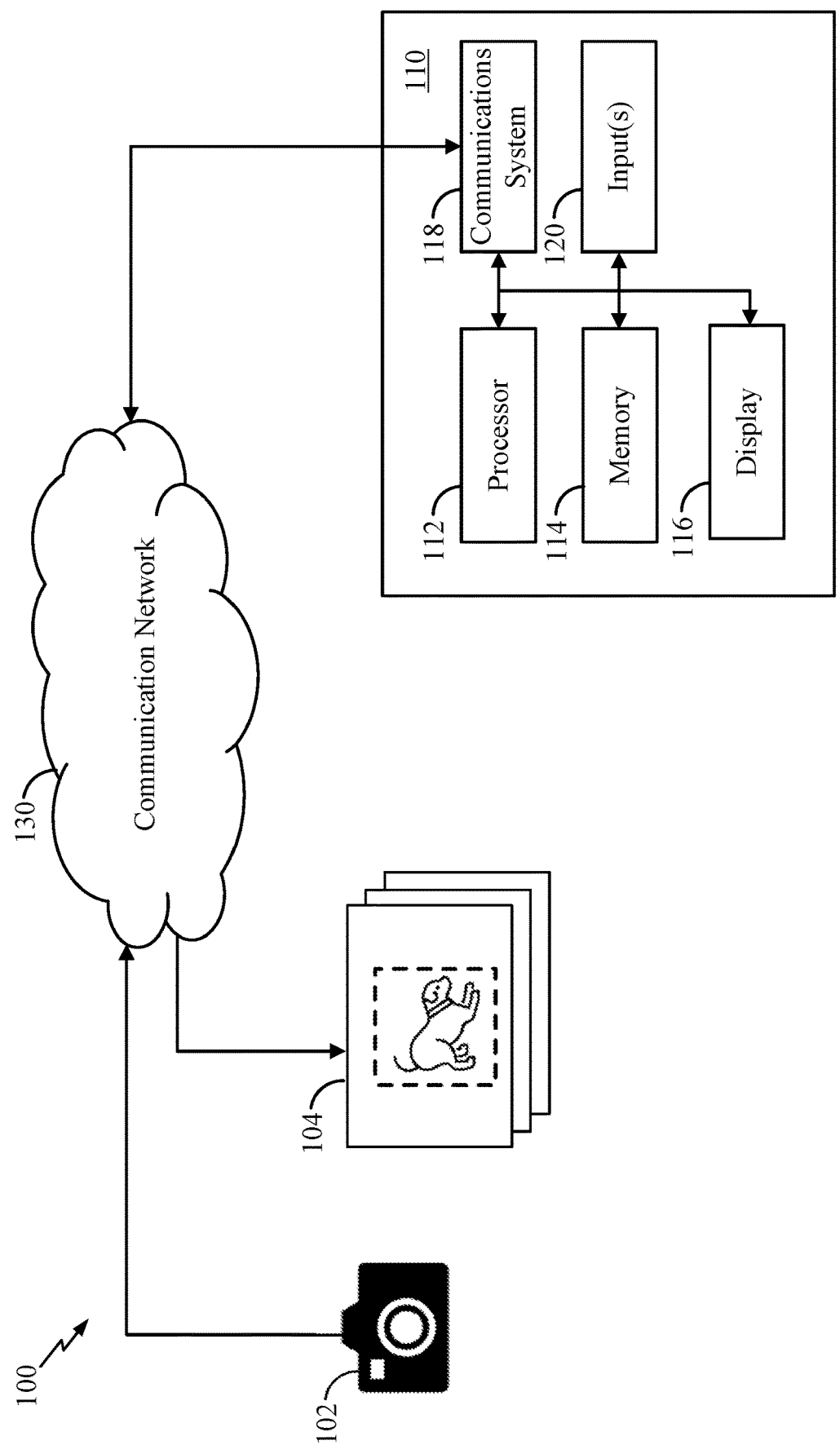
FIG. 1 is a block diagram conceptually illustrating a system for frame recognition according to some embodiments.

FIG. 1 shows a block diagram illustrating an example of systems for frame/image/video recognition according to some embodiments. In some examples, a computing device 110 can obtain frame data 102, which may include at least a first frame and a second frame, from a sensor (such as a camera) or other connected device via the communication network 130, and produce a inference result 104. In some examples, a frame (e.g., the first frame, the second frame, etc.) of frame data 102 can include an image, a video frame, a single photon avalanche diode (SPAD) frame, an event frame, a depth map (with/without an image), a point cloud, or any other suitable data frame.

The computing device 110 can include a processor 112. In some embodiments, the processor 112 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), etc.

The computing device 110 can further include, or be connected to, a memory 114. The memory 114 can include any suitable storage device(s) that can be used to store suitable data (e.g., frame data 102, a inference result 104, a machine learning model, etc.) and instructions that can be used, for example, by the processor 112. The memory may be a memory that is "onboard" the same device as the sensor that detects the frames, or may be a memory of a separate device connected to the computing device 110. The software instructions stored on the memory may cause the computing device to obtain a sequence of data, the sequence comprising at least a first frame, apply the sequence of data to a machine learning model, determine at least one token-level error based on a difference between at least one token of a first representation corresponding to the first frame and a second representation, select a token subset of the first representation based on the at least one token-level error, perform a first transformer operation based on the token subset to produce an output representation corresponding to the token subset, scatter the output representation to a buffer representation corresponding to the first representation, produce a machine learning output score based on the buffer representation, provide an inference result based on the machine learning output score from the machine learning model, update a residual error representation based on the token-level error, determine the token-level error by adding corresponding values from the residual error representation to the difference between corresponding tokens of the first representation and the second representation, generate a binary mask based on one or more token-level errors that exceed a threshold, select the token subset based on the binary mask, update a residual error representation according to the binary mask, select the token subset based on a predetermined number of tokens having largest token-level errors, select the token subset based on a predetermined threshold for token-level error, generate a binary mask based on the token-level error, select the token subset by multiplying the first representation and the binary mask, place a plurality of output tokens of the output representation into the buffer representation to correspond to a plurality of locations in the buffer representation, transpose the key output representation and the key buffer representation, generate a query-key representation based on the query output representation, the query buffer representation, the transposed key output representation, and the transposed key buffer representation, multiply the query buffer representation and the transposed key output representation to produce a first product representation, update the first product representation by scattering the first product representation into the query-key representation, multiply the query output representation and the transposed key buffer representation to produce a second product representation, update the second product representation by scattering the second product representation into the query-key representation, convert the query-key representation into a probability representation, and/or produce an attention-value representation based on a previous probability representation, a previous value buffer representation, a first change in the probability representation, and a second change in the value buffer representation. The memory 114 can include any suitable volatile memory, non-volatile memory, storage, or any suitable combination thereof. For example, memory 114 can include random access memory (RAM), read-only memory (ROM), electronically-erasable programmable read-only memory (EEPROM), one or more flash drives, one or more hard disks, one or more solid state drives, one or more optical drives, etc. In some embodiments, the processor 112 can execute at least a portion of process 300 described below in connection with FIG. 3.

In further examples, computing device 110 can further include communications system 118. Communications system 118 can include any suitable hardware, firmware, and/or software for communicating information over communication network 140 and/or any other suitable communication networks. For example, communications system 118 can include one or more transceivers, one or more communication chips and/or chip sets, etc. In a more particular example, communications system 118 can include hardware, firmware and/or software that can be used to establish a Wi-Fi connection, a Bluetooth connection, a cellular connection, an Ethernet connection, etc.

In further examples, computing device 110 can receive or transmit information (e.g., frame data 102, a recognition data 104, etc.) and/or any other suitable system over a communication network 130. In some examples, the communication network 130 can be any suitable communication network or combination of communication networks. For example, the communication network 130 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 130 can be a local area network, a wide area network, a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc.

In further examples, computing device 110 can further include a display 116 and/or one or more inputs 120. In some embodiments, the display 116 can include any suitable display devices, such as a computer monitor, a touchscreen, a television, an infotainment screen, etc. to display the report, the human activity indication 140, or any suitable result of the path solution 104. In further embodiments, and/or the input(s) 120 can include any suitable input devices (e.g., a keyboard, a mouse, a touchscreen, a microphone, etc.).

Overview of Example Transformer-based Frame Recognition Techniques

Figure 2:
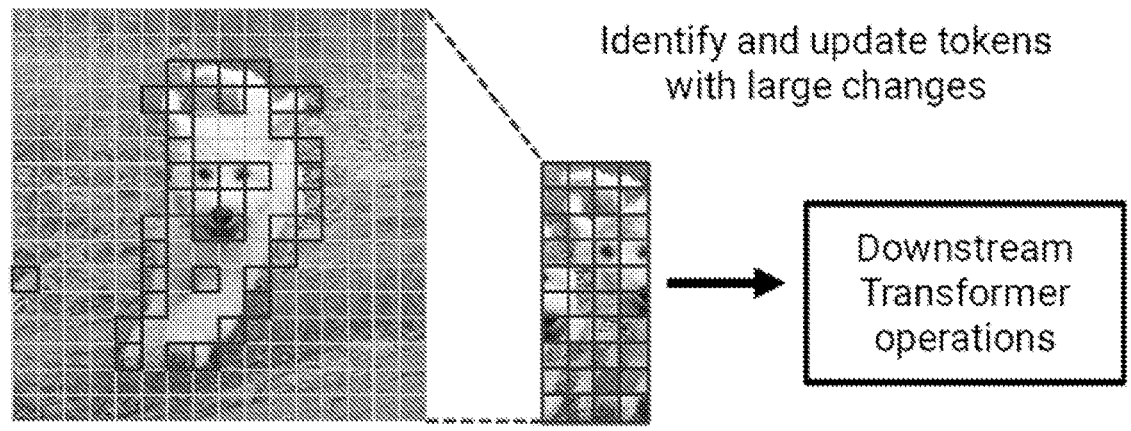
FIG. 2 illustrates an example frame recognition technique overview and results according to some embodiments.
Figure 2:
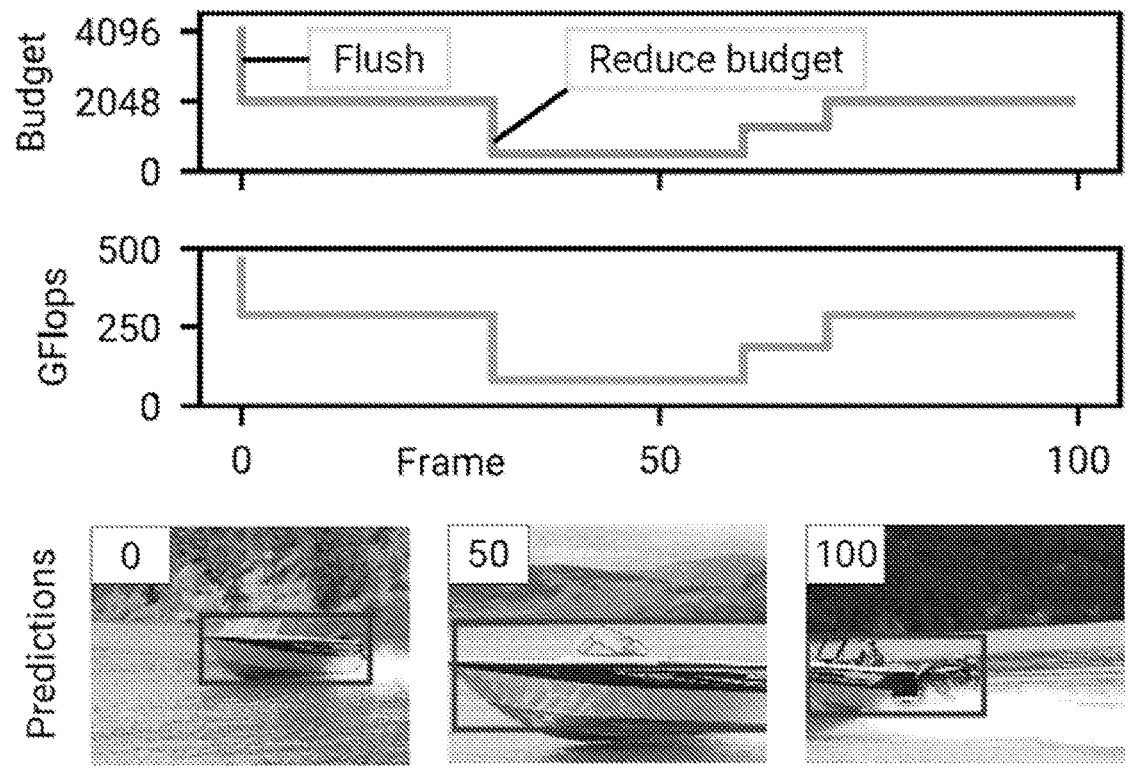

FIG. 2 illustrates an example frame/image/video recognition technique overview and results, in accordance with some of the aspects described herein. (When used herein, references to "video data," "video recognition," "image/video processing," etc. should be understood to apply to both video data (e.g., sequential or periodic frames of a video) as well as sequences or other sequence of data include frame(s)). As described above, vision transformers have shown impressive performance across a range of frame/video recognition tasks. However, vision transformers face a barrier of high computational cost. This is a particular challenge in frame/video recognition, where a model often needs to be repetitively applied to every frame or chunk of frames. And, in the context of especially high frame rate frame/video sources (e.g., such as frame data from high frame rate cameras, or SPAD-based cameras), it can be especially difficult for a processor to run a model while keeping up with incoming frames. High costs preclude vision transformers from being deployed on resource-constrained or latency-critical devices, limiting the scope of this otherwise exciting technology.

In some examples, the disclosed frame/video recognition technique associated with FIGS. 1-11 exploits a new class of transformers that leverages temporal redundancy between inputs and subsequent frames to enable efficient and adaptive inference. This can allow for a much more computationally-efficient approach to utilizing transformers and similar neural network models on frame data. In some examples, the disclosed frame image/video recognition technique can identify 'tokens' that have undergone large changes within each transformer block and save computation by only updating these "non-redundant" tokens. In other words, embodiments of the disclosed frame/video recognition technique can track token-level changes over time, and selectively update the token representations and self-attention maps on each time step of running a transformer-based model on a frame/image/video input stream.

Vision transformers are a type of a neural network architecture that generally comprises a sequence of self-attention and feed-forward layers, which learn to encode an input sequence (such as a series of images or video frames) in a hierarchical and contextualized representation. Transformer models are useful tools for leveraging global or long-range dependencies in images and image sequences. They can utilize what is known as a "self-attentional" model for processing images, which allows them to selectively attend to different parts or patches of an input sequence based on relevance. These patches or regions can be referred to as "tokens," which are selectively attended to by the transformer model.

Various video recognition systems and techniques disclosed herein can equip redundancy-aware transformer blocks (e.g., blocks that implement self-attentional or relevance-based selectivity in processing patches or tokens) with token gating modules, allowing adaptive control of the accuracy-latency tradeoff at runtime. Thus, these video recognition techniques give fine-grained control over the computation cost at runtime, so as to improve computational efficiency and processing throughput. In further examples, the disclosed image/video recognition systems and techniques can be applied to off-the-shelf or customized neural network models (generally without re-training) and are compatible with a wide range of video processing tasks. The experiments described below demonstrate that various implementations of these image/video recognition systems and techniques significantly reduce the computational cost of utilizing transformer-based processing, while preserving the original model's accuracy.

Examples of video recognition techniques utilized in the inventors' experiments were evaluated on large-scale datasets for video object detection (e.g., ImageNet VID) and action recognition (e.g., EPIC-Kitchens 100). Significant reductions were achieved in computation cost with only minor drops in accuracy. For example, on ImageNet VID, the compute cost was reduced by 3.05× with a drop in mAP50 of only 0.93%.

Example Transformer-Based Frame Recognition Process

Figure 3:
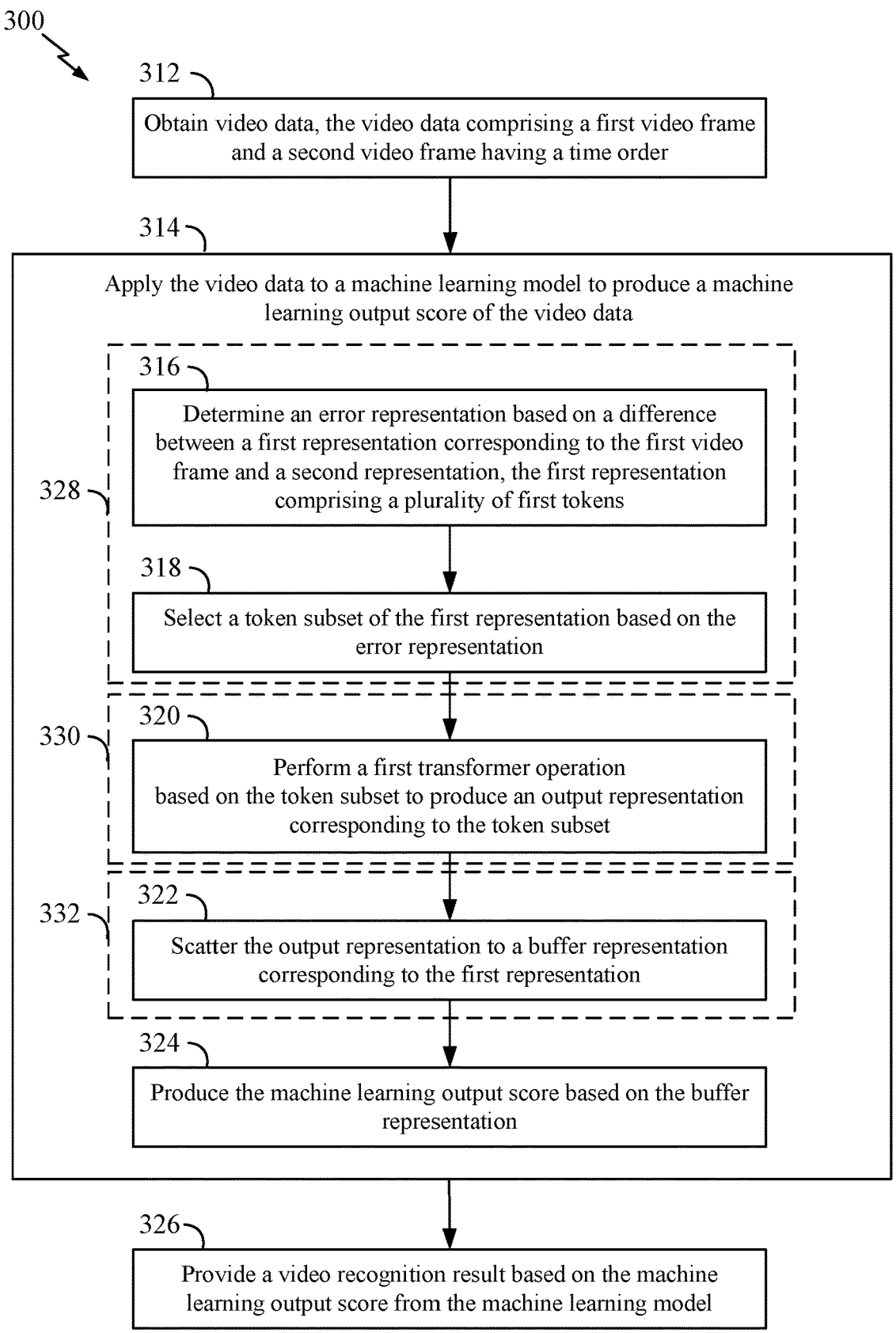
FIG. 3 is a flow diagram illustrating an example process for frame recognition according to some embodiments.

FIG. 3 is a flow diagram illustrating an example process 300 for frame, image, or video recognition in accordance with some aspects of the present disclosure. As described below, a particular implementation can omit some or all illustrated features/steps, may be implemented in some embodiments in a different order, and may not require some illustrated features to implement all embodiments. In some examples, an apparatus (e.g., computing device 110, processor 112 with memory 114, etc.) in connection with FIG. 1 can be used to perform example process 200. However, it should be appreciated that other suitable processing hardware for carrying out the operations or features described below may perform process 300.

At step 312, the process 300 receives a sequence of data. In some examples, the sequence of data can include a first frame and a second frame. In some scenarios, the first frame and the second frame are in time order, whether sequential frames or separated by some periodicity. In some examples, the sequence of data can include multiple frames (e.g., the first and second frames) captured by an imaging device. In further examples, a frame of the sequence of data can include a still image, a video frame, a single photon avalanche diode (SPAD) frame, an event frame, a depth map (with/without an image), a point cloud, or any other suitable data frame to be detected and recognized in the process 300. Depending upon the hardware configuration implementing the method, the sequence of data may be received directly from a sensor, such as a conventional digital camera, high speed camera, SPAD camera, etc. Or, in other embodiments, the frame data may be received via a communicative coupling such as via a USB or remote connection to another processing device, or simply called from a connected memory.

At step 314, the process 300 applies the sequence of data as an input to a machine learning model, to produce a machine learning output score of the first frame. In some examples, the machine learning model can include a transformer-based deep learning model, though it is to be recognized that various other redundancy aware neural network models may also be used and benefit from the advantages described herein. In some examples, the transformer deep learning model can include a sequence of transformer blocks. The input of each block can be a list of N, D-dimensional token vectors, which can be denoted as $x \in \mathbb{R}^{N \times D}$. Before the first transformer block, each image patch can be mapped to a token vector using a linear transform. In some examples, an image can be divided into a uniform grid of square patches (e.g., with 16×16 pixels for a patch, or another size of uniform patches). In other examples, an image can be dynamicaly divided with different patch sizes. In some examples, positional embedding can be injected before the first block or at every block. In some examples, each token in the token vector can have the same size as a image patch of a frame in the sequence of data.

In some examples, a transformer block can map input $x \in \mathbb{R}^{N \times D}$ to output $z \in \mathbb{R}^{N \times D}$ according to:

$$y = MSA(LN(x)) + x, \quad (1)$$
$$z = MLP(LN(y)) + y, \quad (2)$$

where "MSA" denotes multi-headed self-attention. "MLP" is a token-wise multilayer perceptron with two layers and one Gaussian Error Linear Unit (GELU) nonlinearity activation function. "LN" denotes layer normalization.

In some examples, for the MSA, the self-attention operator first applies three linear transforms $W_q, W_k, W_v \in \mathbb{R}^{D \times D}$ to its input $x'=LN(x)$.

$$q = x' W_q \quad (3)$$
$$k = x' W_k$$
$$v = x' W_v.$$

q, k, and v are the "query," "key," and "value" tensors, respectively. In practice, $W_q, W_k, W_v$ are often fused into a single transform $W_{qkv}=[W_q, W_k, W_v]$.

In some examples, the self-attention operator then computes a normalized similarity matrix (attention matrix) $A \in \mathbb{R}^{N \times N}$ between the tokens of q and k.

$$A = \text{Softmax}(qk^T / \sqrt{D}). \quad (4)$$

Softmax normalization is applied along rows of the matrix.

In some examples, the MSA output y' is a weighted sum of the values v (weighted by A), followed by a linear projection $W_p$.

$$y' = (Av) W_p. \quad (5)$$

In some examples, Multi-headed self-attention (as opposed to single-headed self-attention) splits q, k, and v into H tensors of shape $\mathbb{R}^{N \times (D/H)}$ and applies self-attention in parallel across these H heads. The results of all heads are concatenated into a single output tensor with shape $\mathbb{R}^{N \times D}$.

In some examples, the process 300 can perform steps 316-324 via the machine learning model to produce the machine learning output score of the sequence of data. In some examples, the machine learning model includes two modules which can perform groupings of the steps of process 300. Thus, as shown in FIG. 3, certain steps are grouped as a module 328, which represent the operation of a token gate module 328, and other steps are grouped as a module 330 which represent the operation of a buffer module 330 to detect temporal changes at the token level. The token gate module 328 and the buffer module 330 can identify and update only those tokens that have changed significantly since their last update or with respect to a reference representation. For example, the process 300 can perform steps 316 and 318 for the token gate module 328, step 320 for the first transformer operation 330, and step 322 for the buffer module 332.

Figure 4:
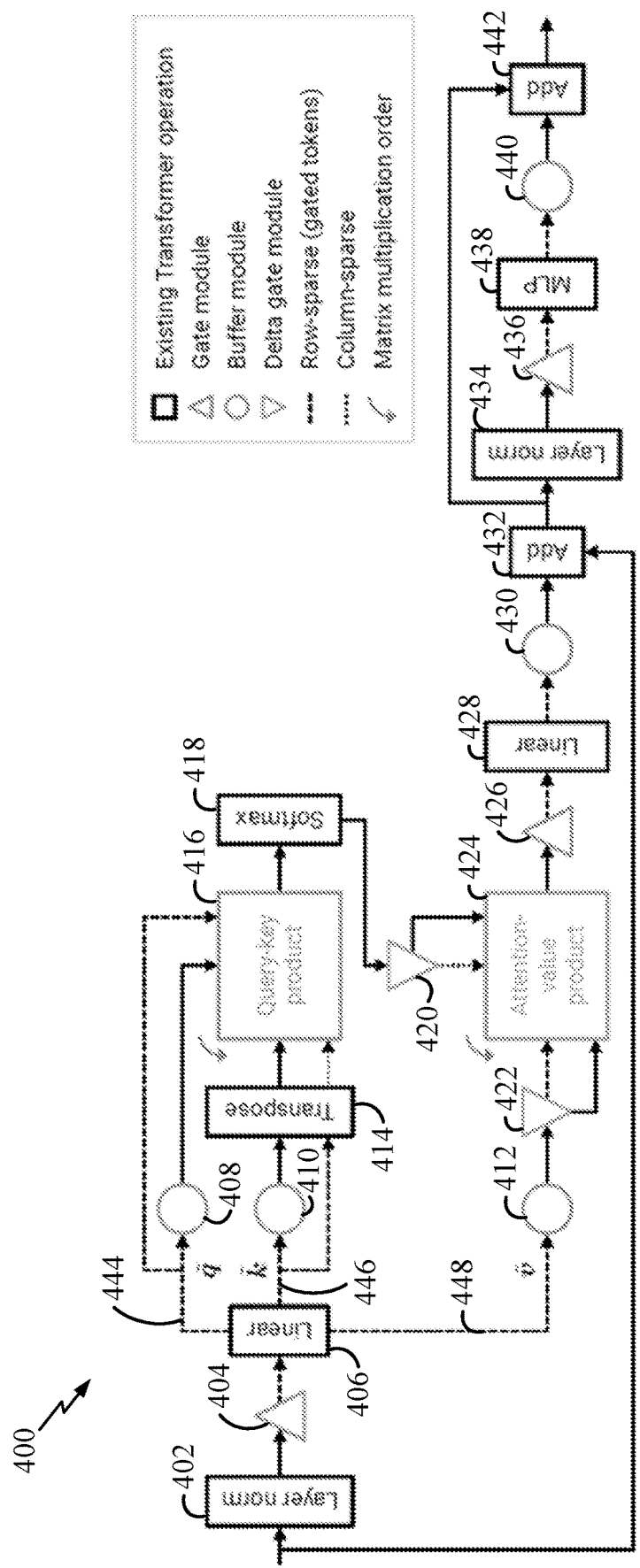
FIG. 4 illustrates an example transformer according to some embodiments.

The operations of process 300 will not be described with combined reference to FIGS. 3 and 4. FIG. 4 is a conceptual diagram depicting functions of an example machine learning model 400 (e.g., a transformer deep learning model) which performs multiple transformer operations of the process 300 of FIG. 3 (i.e., the model 400 of FIG. 4 performs a first linear operation 406, a second linear operation 428, and the MLP 438). In some examples, for the first linear operation 406 shown in FIG. 4 (which in the context of process 300, can be thought of as a first transformer operation 330), the process 300 can perform steps 316 and 318 for a first token gate module 404 (which can function as the token gate module 328 of process 300) and step 322 for first buffer module(s) 408, 410, 412 (functioning as the buffer module 332 of process 300). In some examples, for the second linear operation 428 (another transformer operation 330), the process 300 can perform steps 316 and 318 for a second token gate module 426 as the token gate module 328 and step 322 for a second buffer module 430 as the buffer module 332. In some examples, for the MLP operation 438 (another transformer operation 330), the process 300 can perform steps 316 and 318 for a third token gate module 436 as the token gate module 328 and step 322 for a third buffer module 440 as the buffer module 332.

By construction, the cost of a token-wise operation is proportional to the number of tokens. A gate reduces the number of tokens from N to M. This, in turn, reduces the computational cost of downstream token-wise operations by a factor of N/M. Thus, for process 300, using token gate modules 328 before the various transformer operations 330 reduces the computational cost of the transformer operations 330 and thus the computational cost of the whole process for using the neural network.

Figure 5:
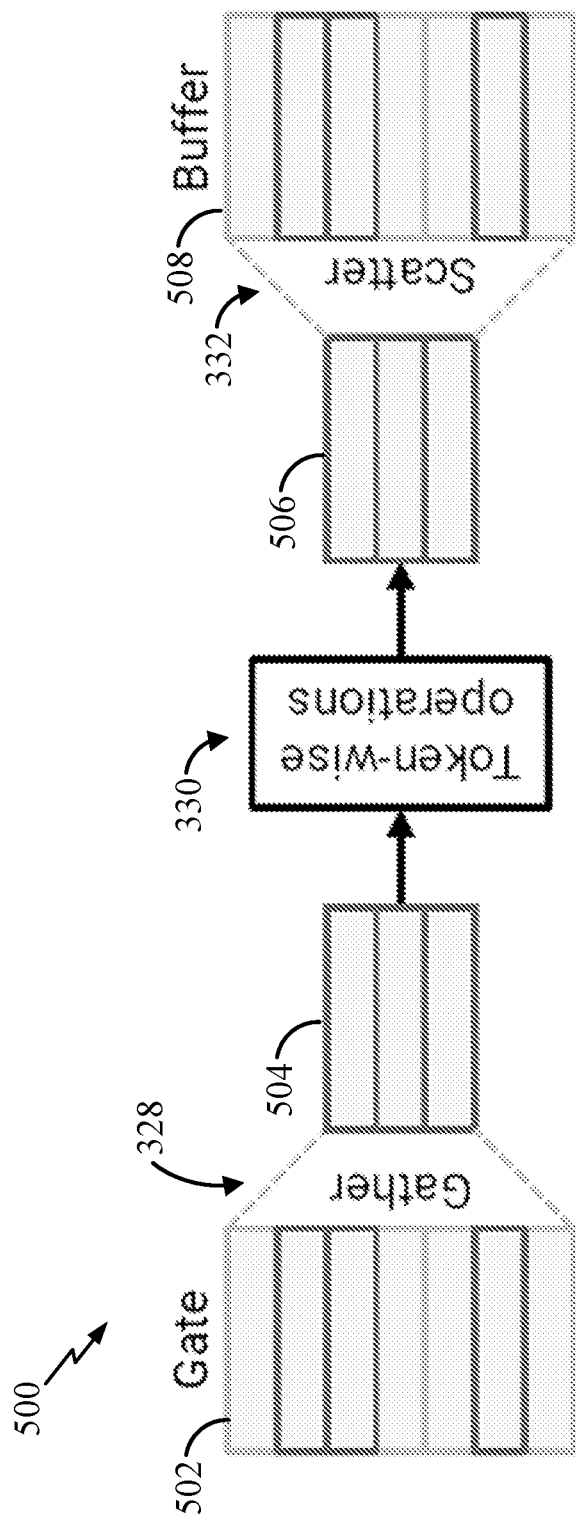
FIG. 5 illustrates example transformer operation acceleration according to some embodiments.

FIG. 5 illustrates an example transformer operation acceleration relating to steps 316-322. For example, the process 300 of FIG. 3 can select a token subset 504 from a first representation 502 (e.g., a set of tokens representing the set of image patches that make up a frame) via the token gating process in steps 316 and 318 using the token gate module 328. The process 300 can perform the first transformer operation 330 (e.g., a token-wise operation) based on the selected token subset 504 of the first representation 502 to produce an output representation 506 corresponding to the token subset 504. Then, the process 300 can scatter the output representation 506 to a buffer representation 508 via step 322 using the buffer module 332. Thus, the process 300 does not need to perform the first transformer operation 330 for all tokens and skip tokens not selected by the token gate model 328.

Figure 6:
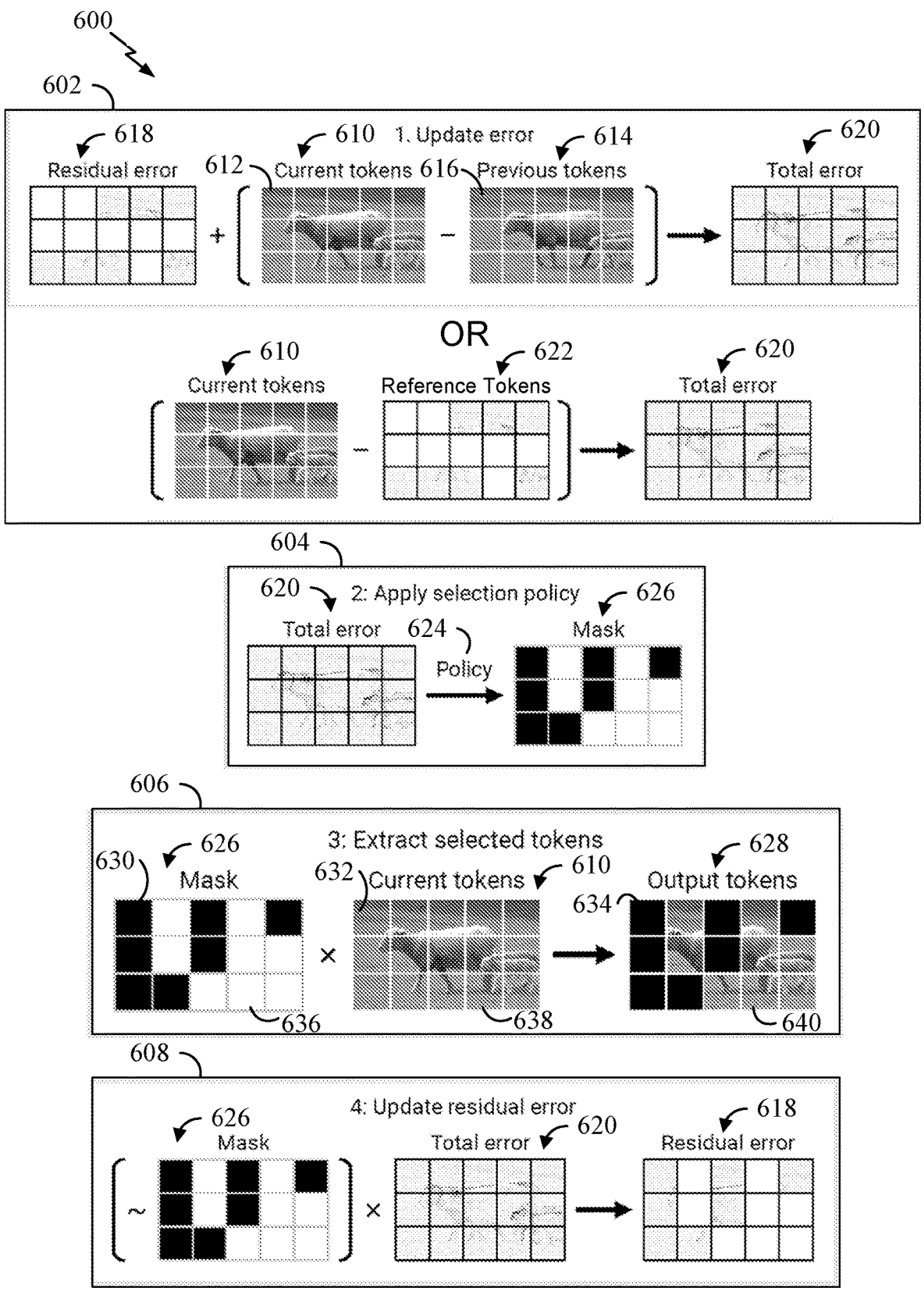
FIG. 6 illustrates an example token gating process according to some embodiments.

Referring again to FIG. 3, at step 316, the process 300, by the machine learning model, determines an error representation based on a difference between a first representation corresponding to the first frame and a second representation. In some examples, the error representation can be determined based on the norm of the difference (e.g., a distance) between each token of the first representation corresponding to a token in the second representation. In some examples, the first representation can include a state tensor including multiple first tokens. In further examples, the multiple first tokens can correspond to multiple patches of the first frame. Thus, a token can have the same size as a patch of the first frame. In some examples, each token has the same size as the other tokens. However, it should be appreciated that some or all tokens can have different sizes at the edge of the frame. In other examples, tokens at a first row/column and a second row/column can have different sizes. Referring again to FIG. 4, in some examples, the first representation can be an input tensor to be provided to at least one of the first token gate module 404, the second token gate module 426, or the third token gate module 436. Referring to FIG. 6, the step 316 can be shown in an example step 602 to update an error for an example token gating process 600.

In operation, the sequence of data of this example includes a second frame. In some examples, the first frame is subsequent to the second frame in time order, and the second representation can correspond to the second frame; in other embodiments, the opposite time order may exist. To determine the error representation, the process 300 can, by the machine learning model, determine the error representation by adding a residual error representation to the difference between the first representation and the second representation. In some examples, the residual error representation can include an accumulated error representation of previous frames of the sequence of data. For example, in FIG. 6, the current tokens 610 are the first representation, and the previous tokens 614 are the second representation corresponding to the second frame. The difference or the norm of the difference between the first representation and the second representation can include the difference or the norm of the difference between each current token 612 of the current tokens 610 (i.e., the first representation) and a corresponding previous token 616 of the previous tokens 614 (i.e., the second representation). In some examples, tokens can be compared based on the position within the frame. For example, the upper-left token in the first frame can be compared to the upper-left token in the second frame. In further examples, the motion of tokens can be tracked over time, and comparisons can be made between tokens with similar content. In further examples in FIG. 6, a total error 620 (i.e., the error representation) can be determined by adding a residual error 618 (i.e., the residual error representation) and the difference or the norm of the difference between the current tokens 610 (i.e., first representation) and the previous tokens 614 (i.e., the second representation). In some examples, the residual error 618 can be residual error accumulation (i.e., from previous comparisons of corresponding tokens) to prevent gradual changes from eroding the model's accuracy over time.

In some examples, the gate module 328 can maintain a state tensor $e \in \mathbb{R}^{N \times D}$ representing the current error in its output. At the start of each time step, e can contain the residual error from all past steps. In some examples, $c \in \mathbb{R}^{N \times D}$ can denote the current gate input (e.g., the first representation), and $p \in \mathbb{R}^{N \times D}$ can denote the input (e.g., the second representation corresponding to the second frame) from the previous time step. On each time step, the gate's state can be updated. In further examples, the error e can be updated using $e + (c-p) \to e$.

In other examples, the second representation can include a reference representation. In such examples, after determining the error representation, the process 300 can, by the machine learning model, redetermine the second representation based on the error representation. In some examples, the reference representation can be used to use less memory and compute faster than two state tensors (e.g., the second representation corresponding the second or previous frame and the residual error representation). In some examples, the reference representation has the same shape as the input tensor (e.g., including N, d-dimensional tokens). In further examples, the total error can be computed by subtracting the reference representation from the current input. When a token is selected by the policy, the corresponding reference representation can be updated by setting it to the value of the corresponding current input token. If a token is not selected by the policy, the corresponding reference token is not updated. For example, in FIG. 6, the current tokens 610 are the first representation, and the reference tokens 622 are the reference representation as a second representation. In some examples, the difference or the norm of the difference between the first representation and the reference representation can include the difference or the norm of the difference between each current token 612 of the current tokens 610 (i.e., the first representation) and a corresponding reference token of the reference tokens 622 (i.e., the reference or second representation). In further examples in FIG. 6, a total error 620 (i.e., the error representation) can be determined by the difference or the norm of the difference between the current tokens 610 (i.e., first representation) and the reference tokens 622 (i.e., the reference or second representation).

In some examples, the process 300, by the machine learning model, can further generate a binary mask. In some examples in FIG. 6, the process 300 can perform a step 604 to apply a selection policy 624 to the error e (e.g., the error representation or the total error 620). The selection policy 624 can return a binary mask m 626 (or a list of token indices) indicating which M tokens are to be sent to the downstream layers for re-computation.

In some examples, the selection policy 624 can include a top-r policy. For example, the process 300, by the machine learning model, can generate the binary mask based on a predetermined number of tokens having largest differences in the error representation. This policy can select the r tokens whose error e has the largest L2 norm. It is lightweight and has a single parameter r. Varying r can give direct control over a model's computation cost. These properties can make the top-r policy a good fit for applications with tight computational constraints, especially when those constraints vary over time. For the top-r policy, the methods to back-propagate through the discrete top-k operator can be used.

In other examples, the selection policy 624 can include a threshold policy. For example, the process 300, by the machine learning model, can generate the binary mask based on one or more tokens of the error representation exceeding a threshold. This policy can select all tokens where the L2 norm of the error e exceeds a threshold h. A threshold policy is input-adaptive. That means, the number of tokens selected depends on the amount of change in the scene. This input adaptivity can potentially lead to a better accuracy-cost tradeoff. In some aspects, the best value for the threshold h can depend on the distribution of token vectors (which varies across layers), and might be difficult to decide. In addition, a threshold policy does not result in a fixed computation cost. In some scenarios, the threshold policy can be suited to applications with flexible computational resources, where achieving the best possible accuracy-cost tradeoff is a desirable factor.

In further exampls, a histogram of error norms can be made to automatically determine a cutoff that cleanly separates tokens with large changes from those with small changes. In further examples, a learned policy (although this may require costly backpropagation through time) can be used.

Referring again to FIG. 3, at step 318, the process 300, by the machine learning model, selects a token subset of the first representation based on the error representation. In some examples, the token subset can include a number of tokens that is less than the tokens in the first representation. In some examples, to select the token subset, the process 300 can, by the machine learning model, select the token subset based on the binary mask. In further examples, to select the token subset, the process 300 can, by the machine learning model, select the token subset by multiplying the first representation and the binary mask. In some examples in FIG. 6, the process 300 can perform a step 606 to extract selected tokens 628 (i.e., token subset).

It should be noted that this process of selecting tokens is conceptually different than the inherent self-attentional attributes of transformers. Here, the process 300 selects tokens based upon differences that are determined and accumulated temporally—in other words, based upon changes in tokens over time. The self-attentional attribute of transformer models can be based on a variety of attributes (which may or may not be temporal in nature) that the model identifies as important. Stated differently, there could be tokens that are important to the self-attentional feature of a model that are not important to the temporal selection aspect of process 300, and vice versa. Thus, the token selection aspect of process 300 can operate separately from and in addition to the natural self-attentional feature of transformer models.

In some examples, the process 300 can multiply the binary mask and the current tokens 610 (i.e., the first representation) to produce the selected token subset 628. In some examples, the multiplication is an element-by-element multiplication. For example, a token 630 in the binary mask 626 can include a '0' value indicating that an image patch corresponding to a token 632 in the first representation does not substantially change since the last image patch corresponding to the second representation of the previous or second frame or the reference representation. Thus, the token 630 with the '0' value in the binary mask multiplied with a corresponding token 632 in the first representation can results in a masked token 634, which is not a selected token among the token subset. On the other hand, another token 636 in the binary mask 626 can include a '1' value indicating that an image patch corresponding to a token 638 in the first representation substantially changes since the last image patch corresponding to the second representation of the previous or second frame or the reference representation. Thus, the token 636 with the '1' value in the binary mask 626 multiplied with a corresponding token 638 in the first representation can results in the same corresponding token 640 in the first representation, which is a selected token among the token subset. In further examples, the selected token(s) and the unselected token(s) can be included in a representation corresponding to the first representation or the binary mask 626.

In further examples, to select tokens in the first representation, the process 300 can, by the machine learning model, apply a gather operation along the first axis of c. IN some examples, the gathered tokens or selected token subset can be denoted as $\tilde{c} \in \mathbb{R}^{M \times D}$ The gate returns $\tilde{c}$ (i.e., the token subset of the first representation) as its output.

In some examples, after determining the error representation, the process 300 can, by the machine learning model, redetermine the residual error representation by multiplying the error representation and the binary mask. In some examples in FIG. 6, the process 300 can perform a step 608 to update the residual error 618 or the reference representation 622. For example, the process 300 can, by the machine learning model, update the residual error 618 (i.e., the residual error representation) by multiplying the total error (i.e., the error representation) and the logically negated binary mask 626 (i.e., ~binary mask 626). In some examples, the multiplication can be an element-by-element multiplication. In some examples, the residual error can be updated by zeroing the residual error tokens corresponding to the tokens selected by the policy. This can be equivalent to multiplying the residual error by a binary mask, where the mask contains "0" if a token was selected by the policy and "1" otherwise. In further examples, the process 300 can reset the error e (the error representation) to zero for all selected tokens after the gating process. In further examples, on the first time step, the gate initializes the error e (the error representation) to zero and returns the full c (e.g., selected subset) as its output. In some examples, the process 300 can update the reference representation 622 based on the token-level error or received from a suitable source. Further the process 300 via the machine learning model can update the reference representation according to a binary mask Referring again to FIG. 3, at step 320 the process 300, by the machine learning model, performs a first transformer operation based on the token subset to produce an output representation corresponding to the token subset. That is, the process 300 can only use the token subset of the first representation rather than the whole tokens in the first representation to perform the first transformer operation. In some examples of FIG. 4, the first transformer operation can include at least one of: a first linear transform operation 406 before the query-key product operation 416 or the attention-value product operation 424 in the MSA, a second linear transform operation 428 after the attention-value product operation 424 in the MSA, or the MLP 438. However, it can be appreciated that the first transformer operation can be any other token-wise operation to receive multiple tokens or a token vector and produce a processed token vector.

In some examples in FIG. 4, the first linear transform operation 406 as a first transformer operation can include the $W_{qkv}$ transform in Equation 3 (i.e., $\tilde{q}=x'W_q$ $\tilde{k}=x'W_k$ $\tilde{v}=x'W_v$, where x' is the token subset) to produce the output representation (i.e., $\tilde{q}$, $\tilde{k}$, and $\tilde{v}$). In the examples, the first representation for the token subset to be input in the first linear transform operation 406 can be the layer-normalized first frame via a layer normalization module 402. In some examples, the output representation includes a query output representation 444, a key output representation 446, and a value output representation 448. In further examples, each of the query output representation 444, the key output representation 446, and the value output representation 448 corresponds to the token subset. In some examples, each of the query output representation 444, the key output representation 446, and the value output representation 448 has the same size of the token subset. In some examples, the first linear transform operation 404 can receive the token subset of the first representation from the first gate module 404 and produce the output representation (i.e., $\tilde{q}$, $\tilde{k}$, and $\tilde{v}$) to the first buffer modules 408, 410, 412. Thus, the first linear transform operation 406 does not need to process every token in the first representation.

In further examples in FIG. 4, the second linear transform operation 428 as a first transformer operation can include the $W_p$ transform in Equation 5 (i.e., y'=(A$\tilde{v}$) $W_p$, where A$\tilde{v}$ is the token subset and y' is the output representation). In some examples, the second linear transform operation 428 can receive the token subset of the first representation from the second gate module 426 and produce the output representation to the second buffer module 430. Thus, the second linear transform operation 428 does not need to process every token in the first representation.

In further examples in FIG. 4, the MLP 438 as a first transformer operation receives the token subset of the first representation from the third gate module 436 and produce the output representation to the third buffer module 440. Here, the first representation can be the output from another layer normalization module 434. Thus, the MLP 438 does not need to process every token in the first representation.

Referring again to FIG. 3, at step 322 the process 300, by the machine learning model, scatters the output representation to a buffer representation corresponding to the first representation. In some examples, to scatter the output representation, the process 300 can, by the machine learning model, place multiple output tokens of the output representation to the buffer representation to correspond to a plurality of locations in the buffer representation. In some examples, the process 300 can, by a buffer module (332 in FIGS. 3 and 408, 410, 412, 430, 440 in FIG. 4), maintain a state tensor $b \in \mathbb{R}^{N \times D}$ (i.e., the buffer representation) that tracks the most recent known value for each of its input tokens. When receiving a new input $f(\tilde{c}) \in \mathbb{R}^{M \times D}$ (i.e., the output representation), the process 300 can, by the buffer module, scatter the tokens in $f(c)$ (i.e., the output representation) to their corresponding locations in b (i.e., the buffer representation). The process 300 can, by the buffer module, return the updated b (i.e., the buffer representation) as its output. Each buffer module (408, 410, 412, 430, 440 in FIG. 4) is paired with a token gate module (404, 426, 436) from earlier in the model. A common pattern is as follows. The gate output $\tilde{c} \in \mathbb{R}^{M \times D}$ is passed to a series of token-wise operations $f(\tilde{c})$. The resulting tensor $f(\tilde{c}) \in \mathbb{R}^{M \times D}$ is then passed to a buffer which restores the full shape $\mathbb{R}^{N \times D}$.

Referring again to FIG. 6, in some scenarios, the selected token subset of the first representation 502 comprises token #2, #3, and #6. Then, the output representation 506 from the first transformer operation 330 can be placed on token #2, #3, and #6 of the buffer representation 508 corresponding to token #2, #3, and #6 of the first representation 502. In some examples, the token subset 504 and the output representation 506 can include positional embeddings to scatter the output representation 506 to corresponding positions in the buffer representation 508.

Referring to FIG. 4, in some examples, the buffer representation can include a query buffer representation (q) scattered from the query output representation ($\tilde{q}$), a key buffer representation (k) corresponding the key output representation ($\tilde{k}$) and a value buffer representation (v) corresponding to the value output representation ($\tilde{v}$). In the examples, the output representation (i.e., the query output representation ($\tilde{q}$), the key output representation ($\tilde{k}$), and the value output representation ($\tilde{v}$) can be obtained from the first linear transform operation 406. Then, the buffer modules 408, 410, 412 can scatter the query output representation ($\tilde{q}$), the key output representation ($\tilde{k}$), and the value output representation ($\tilde{v}$) to the query buffer representation (q), the key buffer representation (k), and the value buffer representation (v), respectively.

In some examples, the process 300 can, by the machine learning model, transpose in a transpose module 414 the key output representation ($\tilde{k}$) and the key buffer representation (k) and generate a query-key representation based on the query output representation ($\tilde{q}$), the query buffer representation (q), the transposed key output representation ($\tilde{k}^T$), and the transposed key buffer representation ($k^T$). In some examples, to generate the query-key representation, the process 300 can, by the machine learning model, multiply the query buffer representation (q) and the transposed key output representation ($\tilde{k}^T$) to produce a first product representation ($q\tilde{k}^T$), update the first product representation by scattering the first product representation into the query-key representation, multiply the query output representation ($\tilde{q}$) and the transposed key buffer representation ($k^T$) to produce a second product representation ($\tilde{q}k^T$), and update the second product representation by scattering the second product representation into the query-key representation. In some examples, the first product representation and the second product representation are the subset of the query-key representation. Thus, the query-key representation can be generated by updating the subset of the query-key representation.

In some examples, Equation 4 can include the query-key product $B = qk^T$. This matrix multiplication can be shown as below.

$$B_{ij} = \sum_p q_{ip} k_{pj}^T. \qquad (6)$$

Element $B_{ij}$ can be updated if either (a) any element in the $i^{th}$ row of q changes, or (b) any element in the $j^{th}$ column of $k^T$ changes. Due to the first token gate module 404 inserted before the $W_{qkv}$ transform (i.e., the first linear operation 406) shown in FIG. 4, only some rows of q and some columns of $k^T$ have changed. In some examples, a subset of B's elements can be recomputed. Thus, the query-key product module 416 is introduced in FIG. 4.

In some examples, $x' \in \mathbb{R}^{M \times D}$ denotes the output (i.e., the token subset) of the first token gate module 404 before the $W_{qkv}$ transform (i.e., the first linear operation 406). Then, $\tilde{q} = \tilde{x}'W_q$ and $\tilde{k} = \tilde{x}'W_k$. In some examples, q (i.e., the query buffer representation) and k (i.e., the key buffer representation) denotes the output of the $\tilde{q}$ (i.e., the query output representation) and $\tilde{k}$ (i.e., the key output representation). $\tilde{q}$ and $\tilde{k}$ can contain the updated tokens of q and k.

Figure 7:
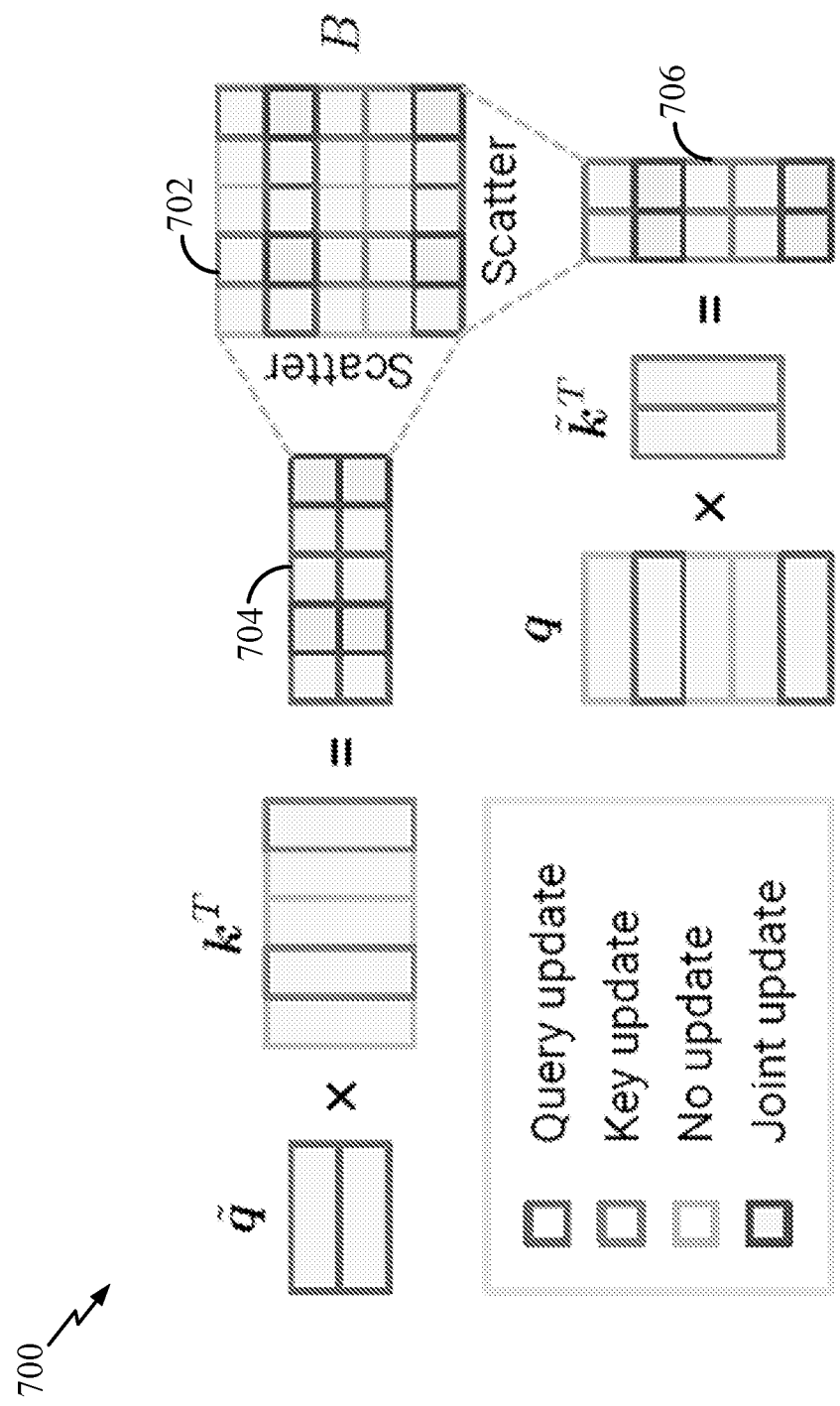
FIG. 7 illustrates an example query-key product according to some embodiments.

FIG. 7 depicts an example query-key product 700 for updating elements of B 702 (i.e., the query-key representation). The product $\tilde{q}k^T$ 704 (i.e., the second product representation) contains the elements of B 702 to be updated due to $\tilde{q}$ (i.e., the query output representation). $\tilde{q}k^T$ 704 can be computed, then the result row-wise can be scattered into the B from the last time step. An analogous approach can be computed for the $\tilde{k}$-induced updates; $q\tilde{k}^T$ 706 (i.e., first product representation) can be computed, and the result column-wise can be scattered into B 702.

The overall cost of these updates is 2NMD, compared to $N^2 D$ for a standard matrix multiplication. This cost is proportional to M, the number of tokens selected by the gate.

Thus, computation can be saved when M<N/2 (when we update fewer than half of the tokens). In further examples, the tokens in q̃ from q can be removed before computing q̃k$^T$ to avoid double-computing these elements. Then, q̃k$^T$ can be scattered using an index along both axes of B.

In some examples of FIG. 4, the process 300 can, by the machine learning model, convert the query-key representation into a probability representation (e.g., using a softmax module 418 in FIG. 4), and produce an attention-value representation (e.g., using an attention-value product module 424) based on a previous probability representation ($A_0$ or $\tilde{A}_0$), a previous value buffer representation ($v_0$ or $\tilde{v}_0$), a first change (AΔ or $\tilde{A}_A$) in the probability representation (A), and a second change (v Δ or $\tilde{v}_A$) in the value buffer representation (v).

In some examples, Equation 5 can include the attention-value product Av. Because of the first token gate modeul 404 before the $W_{qkv}$ transform (i.e., the first linear transform operation 406), only some tokens (rows) of v change on each time step. However, every column of v contains some updated values. The multiplication Av can be explicitly written as:

$$(Av)_{ij} = \sum_p A_{ip} v_{pj}. \qquad (7)$$

Because every column of v contains some updated elements, every element of Av changes each time step. This can indicate a different strategy from a previous strategy, where only some of the output values are updated.

Instead, a delta-based update strategy can be used for the attention-value product modeul 424. In some examples, $A_o$ (i.e., the previous probability representation) and $v_0$ (i.e., the previous value buffer representation) denote the last known values for A and v. Let $A_A$ (i.e., the first change in the probability representation) and $v_A$ (i.e., the second change in the value buffer representation) denote changes in A and v. Define $A_n = A_o + A_A$ and $v_n = v_o + v_A$. In some examples, the updated the product $A_n v_n$ can be written as $$A_n v_n = (A_o + A_A)(v_o + v_A) \qquad (8)$$
$$= A_o v_o + A_o v_A + A_A v_o + A_A v_A.$$

Therefore, on each time step, Av (i.e., the attention-value representation) can be updated by adding $A_A v_o + A_o v_A + A_A v_A$ to the previous result $A_o v_o$. In some examples, $A_A$, $v_A$, $A_o$, and $v_o$ can be obtained using delta gate modules 420, 422. In some examples, a first delta gate module 420 can be applied to A, and a second delta gate module 422 can be applied to the output of the v buffer (i.e., the value buffer representation). In further examples, the A gate can be configured to select columns of A.

A delta gate module can be similar to the gate module defined above, with a couple of differences. Before the other gate updates, a delta gate computes o=p−e, where o represents the last known value of the gate's output (this corresponds to $A_o$ or $v_o$ in Equation 8). After the other gate updates, the delta gate returns two outputs: o and ẽ. ẽ is produced by gathering selected tokens from e and corresponds to $A_A$ or $v_A$ in Equation 8.

Figure 8:
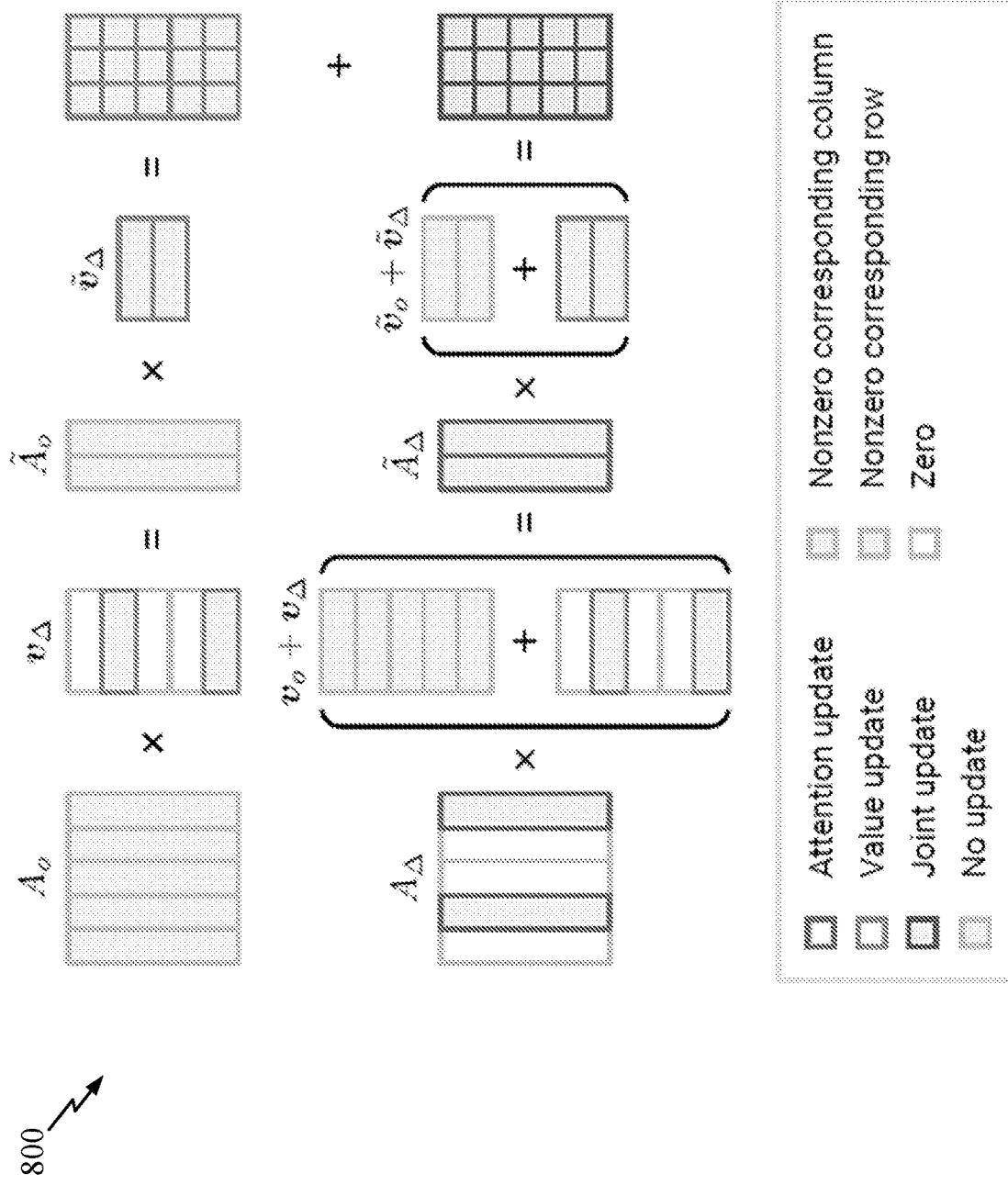
FIG. 8 illustrates an example attention-value multiplication according to some embodiments.

FIG. 8 illustrates an example approach 800 for efficiently computing the three delta terms in Equation 8. In some examples, the rows of $v_o$ that correspond to zero columns in $A_A$ (these rows will always be multiplied by zero) can be removed. In further examples, $\tilde{v}_o$ denotes v with these rows removed. In further examples, columns of $A_o$ can be removed analogously to produce $\tilde{A}_o$. Then, the following equation can be computed:

$$\tilde{A}_o \tilde{v}_A + \tilde{A}_A \tilde{v}_o + \tilde{A}_A \tilde{v}_A, \qquad (9)$$

adding the result to the previous value of Av.

To compute $\tilde{A}_A \tilde{v}_A$, the columns of $\tilde{A}_A$ can be aligned with the rows of $\tilde{v}_A$. This can be achieved by forcing the A gate to select the same indices as the v gate. Using a separate policy in the A gate is possible, but can use extra alignment steps. Further, aligning the operands saves a multiplication as it can rearrange Equation 9 as:

$$\tilde{A}_o \tilde{v}_A + \tilde{A}_A (\tilde{v}_o + \tilde{v}_A). \qquad (10)$$

Equation 10 has a cost of 2MND (assuming the addition flops are negligible), compared to N$^2$D for a regular multiplication. We save computation when M<N/2.

In further examples, the output representation can be obtained from the second linear transform operation 428. Then, the second buffer module 430 can scatter the output representation to the buffer representation. In the examples, the output representation from the second linear transform operation 428 is different from the output representation from the first linear transform operation 406. Also, the buffer representation from the second buffer module 430 is different from the buffer representation from the first buffer module(s) 408, 410, 412.

In further examples, the output representation can be obtained from the MLP 438. Then, the third buffer module 440 can scatter the output representation to the buffer representation. In the examples, the output representation from the MLP 438 is different from the output representation from the second linear transform operation 428. Also, the buffer representation from the third buffer module 440 is different from the buffer representation from the second buffer module 430.

In some examples, steps 316-322 can be used in multiple token-wise operations, which do not involve any information exchange between tokens. As described at step 320, process 300 can use steps 316-322 in the MLP and the linear transforms in the MSA. Thus, the process 300 can save computation in token-wise operations by skipping tokens not selected by the gate. This does not affect the result of the operation for the selected tokens.

At step 324 the process 300, by the machine learning model, produces the machine learning output score based on the buffer representation. In some examples, the machine learning output score can include a confidence score for object detection or classification in the first frame.

At step 326, the process 300 can provide a inference result based on the machine learning output score from the machine learning model. In some examples, the inference result can include a recognition indication, a detection indication (e.g., a box including the detected object, an outline, a text, a symbol, or any other suitable indication) of a detected object. In some example, the inference result can be provided when the machine learning output score exceed a threshold. However, it should be appreciated that any suitable indication to provide a inference result.

Experiments

Object Detection: The example method disclosed herein on object detection was tested using the ImageNet Large Scale Visual Recognition Challenge (ILSVRC) 2015 ImageNet Visual-Inertial-Dynamical (VID) data. The results on the validated set were reported, which contained 555 videos with lengths of up to 2895 frames. Following prior works, the mean average precision (mAP) metric was evaluated with an IoU threshold of 0.5.

The Vision Transformer Detector (ViTDet) model was applied to individual frames of an input video. ViTDet combined a plain Transformer backbone (based on ViT-B) with a standard detection head. The backbone included 12 blocks with interleaved global and local self-attention, each with a set of learned relative position embeddings. The model was converted to an Eventful Transformer following the method mentioned in the previous section. In blocks with global attention, the method was applied to all components; in blocks with windowed attention, the method was applied only to token-wise operations.

The original ViTDet weights (trained on Common Objects in Context (COCO)) were fine-tuned for VID object detection. Note that the fine-tuning was performed before any temporal redundancy awareness was added to the model. Training was performed at resolution 1024×1024, and evaluation at 1024×1024 and 672×672 (the position embeddings for resolution 672 were interpolated).

Comparison was performed against the patio-Temporal Graph Transformer (STGT) method using the same top-r policy for both STGT and the example method disclosed herein. An ablated version of this method that only accelerates token-wise operations (without redundancy awareness in the attention-value or query-key products) was also considered. The policy r was varied to explore the accuracy-compute tradeoff. At resolution 1024, r=256, 512, 1024, 1536, and 2038 (from a maximum of 4096 tokens) was tested. At resolution 672, r=128, 256, 512, 768, and 1024 (from a maximum of 1764) was tested.

Figure 9:
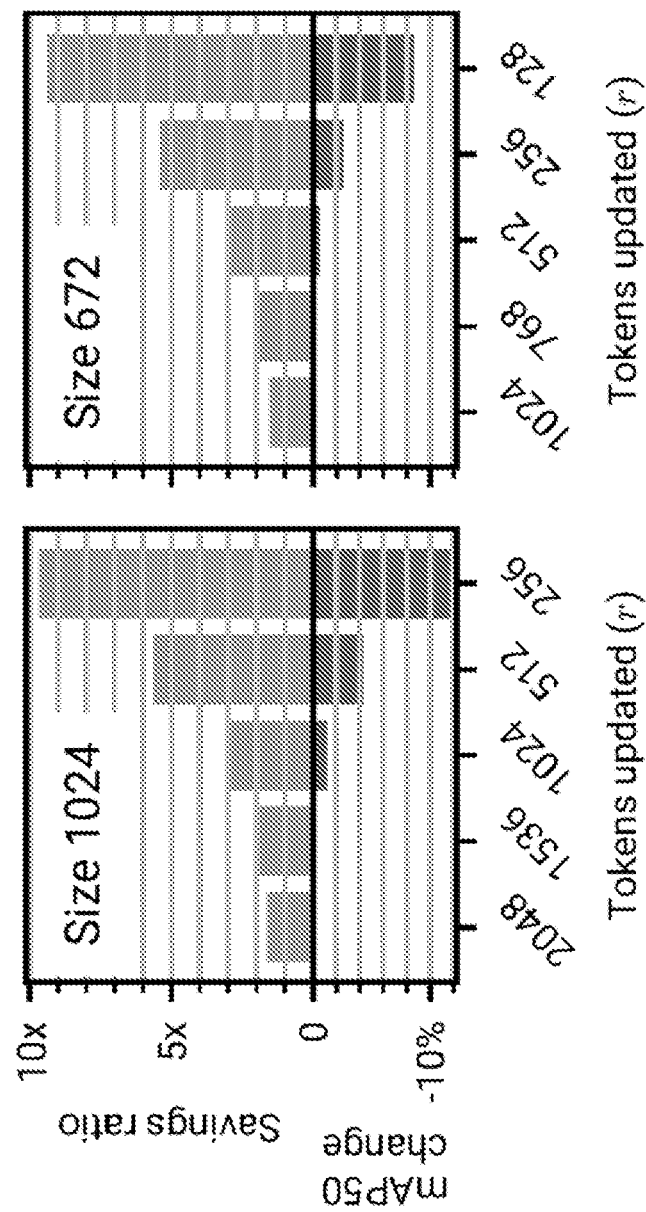
FIG. 9 illustrates example results of experiments carried out using a base transformer model trained to perform object detection that was modified using techniques described herein showing tradeoffs between computational savings and accuracy.

FIG. 9 shows the overall results. The example method described herein gives computation savings with only modest reductions in accuracy. For example, at resolution 1024 and with an r-value of 1024, the example method reduces the per-frame cost from 462.8 Gflops to 151.5 Gflops (a 3.05× reduction) while reducing the mAP50 score from 82.9% to 82.0% (−0.9% in absolute mAP and a relative drop of 1.1%).

Figure 10:
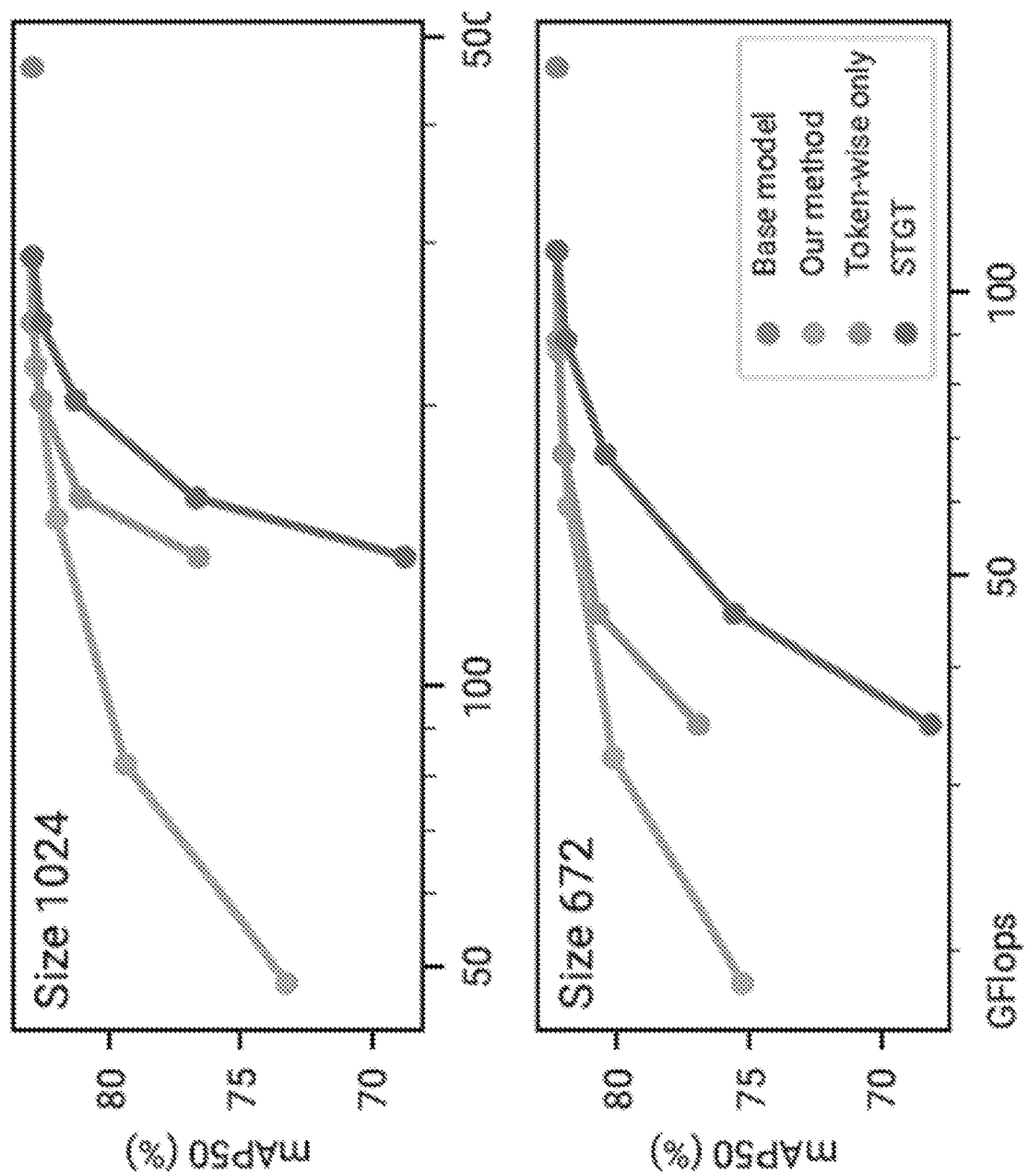
[FIG. 10 illustrates example results of experiments carried out using an object detection transformer model implemented using techniques described herein showing tradeoffs between computational savings and accuracy at particular frame resolutions compared to performance of the base transformer model.

FIG. 10 shows the accuracy-compute tradeoff for the method, along with baselines. The method gives a considerable improvement in the accuracy-compute tradeoff compared to STGT. Further, adding redundancy awareness to the query-key and attention-value products reduces the cost, especially at low r values.

Video Action Recognition: The method was evaluated on action recognition using the EPIC-Kitchens 100 dataset. EPIC-Kitchens 100 contains highly dynamic egocentric videos annotated with 97 verb and 300 noun classes.

The Video Vision Transformer (ViViT) model was used with factorized spatial and temporal sub-models (both based on ViT-B). The spatial sub-model was sequentially applied to 16 input clips (32 frames, grouped into 2-frame clips). The outputs of the spatial model were concatenated and passed to the temporal model, which retuned a prediction. The spatial model represented the bulk of the compute cost.

The spatial model was converted to an Eventful Transformer (applying the method to the self-attention operators in all blocks). Naively replacing the spatial model with an Eventful version led to a relatively large drop in accuracy. This drop was likely due to a distribution shift in the pattern of temporal changes produced by the spatial model. Most of the lost accuracy was recovered by fine-tuning only the non-Eventful temporal model on the outputs of a frozen Eventful spatial model.

The ViViT model pretrained on EPIC-Kitchens 100 was first used and the temporal model was fine tuned on the training set. Different variants of the model with policy r values of 50, 100, and 200 (out of a maximum of 401 tokens) were fine-tuned. The results using the top-1 accuracy metric were reported, following the standard protocol.

Figure 11:
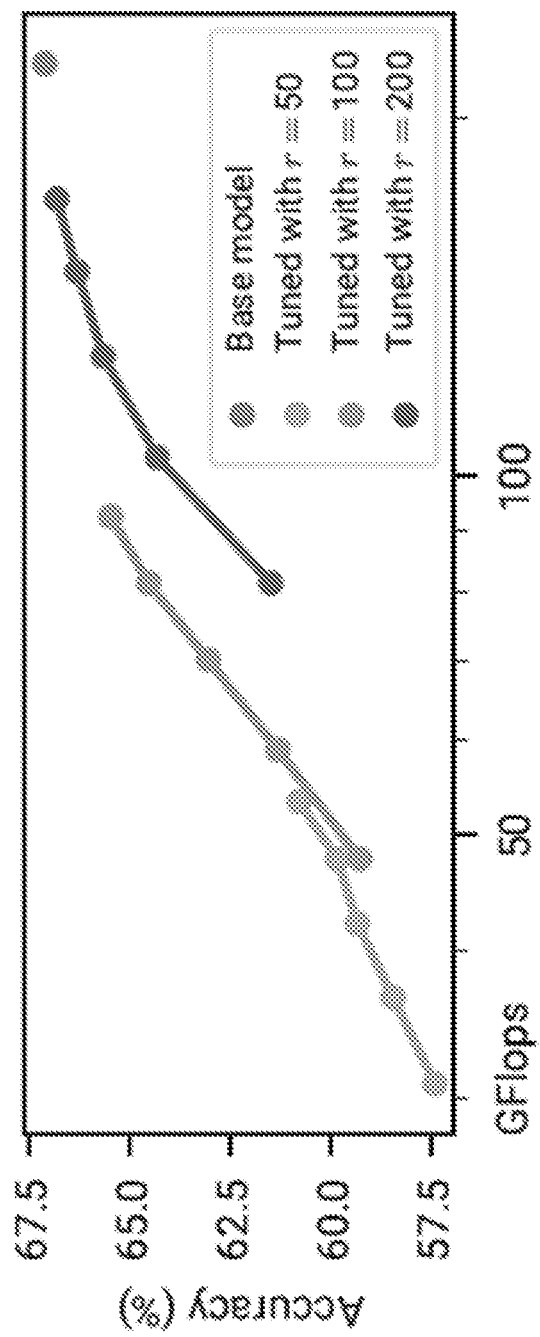
FIG. 11 illustrates example results of experiments carried out using an object detection transformer model implemented using techniques described herein showing tradeoffs between computational savings and accuracy when using policies that updated different numbers of tokens for each frame compared to performance of the base transformer model.

FIG. 11 shows results for the Eventful ViViT model. A range of r values for each of the fine-tuned variants were evaluated. The original fine-tuned r-value were tested, along with ±20% and ±40% of this value. The large computation savings were observed, with only moderate reductions in accuracy. For example, with r=140, the cost was reduced by 2.4× while reducing the accuracy by only 1.65%. in addition, the model trained adaptivity despite being fine-tuned with a single r-value, exhibiting a good accuracy-compute tradeoff over a range of r-values.

Further Examples

Spatial Redundancy and Runtime: Eventful Transformers exploit temporal redundancy and thus complement prior works that consider spatial redundancy. A proof-of-concept experiment is presented, that adds spatial-redundancy awareness to an Eventful Transformer.

Specifically, a variant was adopted, which spatially pooled the self-attention key and value tokens. This method was applied to the global self-attention operators in the ViTDet model. The method was evaluated both with and without temporal redundancy awareness. In the temporal-redundancy model, k and v were pooled after their respective buffers. By first pooling the active indices and then gathering from the buffered k using the pool indices, $\bar{k}$ was pooled.

Table 1 shows the results. The spatial and temporal methods are complementary; both contributing to a reduction in the computational cost.

The runtime of the implementation on both a CPU (Xeon Silver 4213, 2.2 GHz) and a GPU (NVIDIA RTX™ 3090) was evaluated. On the CPU, an upper limit of 8 threads was set to prevent contention with system processes. Table 2 shows the results. Adding temporal redundancy awareness led to speedups of up to 1.52× on the GPU and 2.48× on the CPU. The ratios could be further improved with additional engineering effort (e.g., by replacing standard PyTorch operators with custom kernels).

TABLE 1

Adding spatial redundancy to ViTDet. "Spatial" is a model with pooling in k and v. "Spatiotemporal" is a model with both pooling and temporal redundancy awareness.

| Variant | r | mAP50 (%) | Gflops |
|---|---|---|---|
| Base model | — | 82.93 | 462.8 |
| Spatial | — | 80.15 | 385.5 |
| Spatiotemporal | 2048 | 80.13 | 214.2 |
| Spatiotemporal | 1536 | 80.06 | 166.5 |
| Spatiotemporal | 1024 | 79.50 | 118.2 |

TABLE 1-continued

Adding spatial redundancy to ViTDet. "Spatial"
is a model with pooling in k and v. "Spatiotemporal"
is a model with both pooling and temporal redundancy awareness.

| Variant | r | mAP50 (%) | Gflops |
|---|---|---|---|
| Spatiotemporal | 512 | 76.97 | 68.2 |
| Spatiotemporal | 256 | 71.29 | 41.8 |

TABLE 2

Runtime. All values are milliseconds per frame. ViTDet
runtimes are for the Transformer backbone only.
ViViT runtimes include the temporal sub-model.

| Model | Variant | r | GPU | CPU |
|---|---|---|---|---|
| ViTDet | Base model | — | 88.6 | 5031 |
| ViTDet | Spatial | — | 60.9 | 2980 |
| ViTDet | Temporal | 512 | 83.1 | 3378 |
| ViTDet | Spatiotemporal | 512 | 42.9 | 1554 |
| ViViT | Base model | — | 31.3 | 1638 |
| ViViT | Temporal | 50 | 20.6 | 661 |

Figure 12:
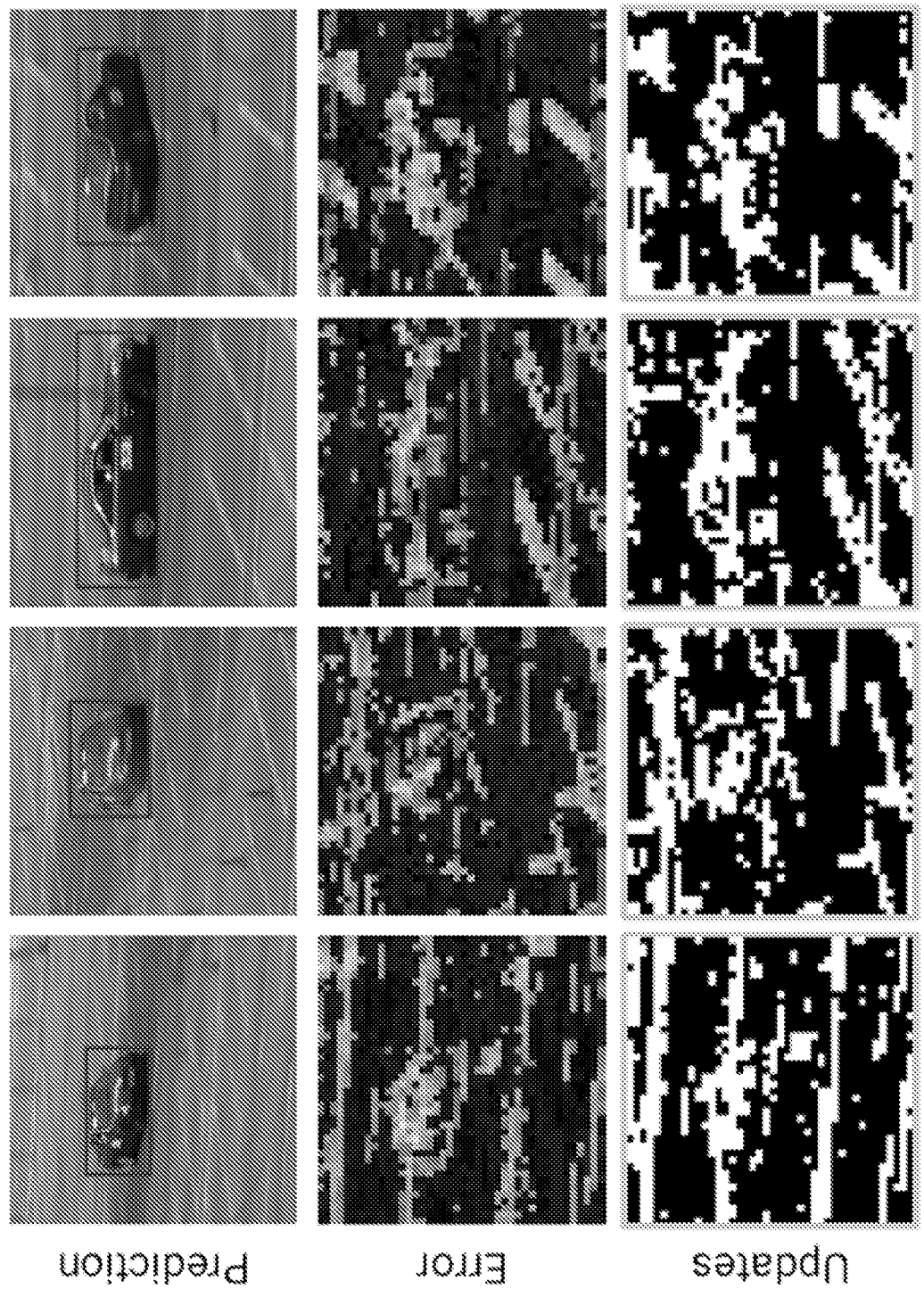
FIG. 12 illustrates results from an example video sequence, with model predictions superimposed on video frames in the top row, the token-wise L2 norm of the error e in the middle row, and the update mask visualized.

FIG. 12 shows an example video sequence. The model predictions (top), the token-wise L2 norm of the error e (middle), and the update mask (bottom) are all visualized. The larger error values correspond to dynamic regions in the image.

The method reduced the floating point operations (and associated memory access operations) at the cost of higher memory usage. The extra memory usage for gates and buffers is generally modest. For example, consider ViTDet with input size 672. This model has 1764 tokens of dimension 768. A token buffer requires only 5.4/2.7 MB of memory at full/half precision.

However, gating or buffering the attention matrix A may require a more substantial amount of memory. For example, in the global attention layers of the size-672 ViTDet model, the A matrix has shape 1764×1764×12. Buffering this A requires 149/75 MB at full/half precision. Fortunately, this is only a problem when self-attention is global and the number of tokens is large. For example, buffering the A matrix in the ViViT model (301 tokens) requires only 4.3/2.2 MB.

Applications

The systems and methods described herein may find application in a variety of scenarios and use cases.

For example, the foregoing techniques may be utilized on conjunction with data obtained from a variety of sources, where the use of vision transformers in a more computationally-efficient manner would be advantageous. In some embodiments, the methods and systems described herein may find application in a system that acquires data from a very high frame-rate source, such as a SPAD camera, depth camera, or a high frame rate optical camera. In such embodiments, the large number of frames can be processed by vision transformer models modified to be eventful transformers (as described above), at a computationally feasible rate. Similarly, the methods and systems herein may also find application in embodiments in which a large number of frames exist, even if they were not obtained at a high frame rate (e.g., lengthy security footage, lengthy time lapse videos, geological or astronomical data, etc.).

The techniques described herein may also find application in conjunction with data obtained in real time or with an unknown length. Because the systems and methods described herein do not necessarily require a priori knowledge of the lengthy of a video image, then can be applied to a stream of data as it arrives. This allows for use in situations where a video stream may be of unknown duration, or in which a video stream could be shut off (or periodically turned on/off) once an eventful vision transformer detected an object of interest (or otherwise performed the purpose for which it was trained). For example, an eventful video transformer could be used to detect objects, perform video/action recognition (e.g., chunks of video), optical flow, or any frame-wise task such as pose/depth estimate) in a much more computationally-efficient manner than any known techniques.

In some embodiments, an application, system or service may be provided which is programmed to modify pre-trained vision transformer models to turn them into eventful transformers. For example an operating system of a mobile device may be equipped to reduce computational requirements of a vision transformer by modifying it to be an eventful transformer. Or a software-as-a-service offering may be implemented by which developers can modify their pre-trained vision transformers; the service would return a modified version of their vision transformer than is capable of operating as an eventful transformer. Of course, it should be understood that the embodiments described herein are not limited to modification of pre-trained vision transformer models. Instead, the inventors contemplate that models could be trained from the outset to be eventful vision transformers.

In yet further embodiments, systems deploying eventful transformers may utilize a user interface that permits a user to adjust the threshold for how many tokens can be skipped per frame in a variety of ways depending upon the application. For example, a user may be permitted to adjust the threshold for top_R tokens that are skipped, to skip or process more or fewer tokens per frame. This may have a mild impact on accuracy versus computational speed tradeoff. Similarly, the number of tokens skipped via the L2 Norm method (described above) could also be adjusted by a user in a related fashion. For example, in the context of an autonomous vehicle, drone, or robot, when the machine is moving at a very high speed, processing speed becomes increasingly important, so a user may program the threshold to be a lower value inversely proportional to speed. Then, at slower speeds, greater accuracy may be desired and higher computational speed may be acceptable, for finer-grain object identification for example. In other embodiments, an eventful transformer could employ a learned policy for determining how many tokens to skip per frame under given circumstances. An application using such a policy could create a penalty for updates, such that its aim is to minimize the number of token updates per frame while maintaining acceptable accuracy. Embodiments using such a learned policy may benefit from being initially trained as eventful transformers.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for processing frame data comprising:
obtaining a sequence of data, the sequence comprising at least a first frame;
applying the sequence of data to a machine learning model, the machine learning model configured to:
determine at least one token-level error based on a difference between at least one token of a first representation, corresponding to the first frame, and a second representation, the first representation comprising a plurality of first tokens;
select a token subset of the first representation based on the at least one token-level error;
perform a first transformer operation based on the token subset to produce an output representation corresponding to the token subset;
scatter the output representation to a buffer representation corresponding to the first representation; and
produce a machine learning output score based on the buffer representation; and
providing an inference result based on the machine learning output score from the machine learning model.

2. The method of claim 1, wherein the machine learning model comprises a vision transformer deep learning model.

3. The method of claim 1, wherein after determining the at least one token-level error, the machine learning model is configured to update a reference representation based on the token-level error.

4. The method of claim 1, wherein the second representation comprises a reference representation, and
wherein the machine learning model is configured to determine the token-level error by the difference between corresponding tokens of the first representation and the reference representation.

5. The method of claim 1, wherein the sequence of data further comprises a second frame, the first frame being subsequent to the second frame in time order,
wherein the second representation corresponds to the second frame,
wherein the machine learning model is configured to determine the token-level error by adding corresponding values from a residual error representation to the difference between corresponding tokens of the first representation and the second representation, and
wherein the residual error representation comprises an accumulated error representation of previous frames of the sequence of data.

6. The method of claim 1, wherein the machine learning model is further configured to generate a binary mask based on one or more token-level errors that exceed a threshold,
wherein the machine learning model is configured to select the token subset based on the binary mask, and
wherein the machine learning model is configured to update a reference representation according to the binary mask.

7. The method of claim 1, wherein the machine learning model is further configured to select the token subset based on a predetermined number of tokens having largest token-level errors.

8. The method of claim 1, wherein the machine learning model is further configured to select the token subset based on a predetermined threshold for token-level error.

9. The method of claim 1, wherein the machine learning model is further configured to generate a binary mask based on the token-level error, and wherein the machine learning model is configured to select the token subset by multiplying the first representation and the binary mask.

10. The method of claim 1, wherein to scatter the output representation, the machine learning model is configured to place a plurality of output tokens of the output representation into the buffer representation to correspond to a plurality of locations in the buffer representation.

11. The method of claim 1, wherein the first transformer operation comprises a linear transform to produce the output representation, the output representation comprising a query output representation, a key output representation, and a value output representation, each of the query output representation, the key output representation, and the value output representation corresponding to the token subset, and
wherein the buffer representation comprises a query buffer representation scattered from the query output representation, a key buffer representation corresponding the key output representation, and a value buffer representation corresponding to the value output representation.

12. The method of claim 11, wherein the machine learning model is further configured to:
transpose the key output representation and the key buffer representation; and
generate a query-key representation based on the query output representation, the query buffer representation, the transposed key output representation, and the transposed key buffer representation.

13. The method of claim 12, wherein to generate the query-key representation, the machine learning model is configured to:
multiply the query buffer representation and the transposed key output representation to produce a first product representation;
update the first product representation by scattering the first product representation into the query-key representation;
multiply the query output representation and the transposed key buffer representation to produce a second product representation; and
update the second product representation by scattering the second product representation into the query-key representation.

14. The method of claim 12, wherein the machine learning model is further configured to:
convert the query-key representation into a probability representation; and
produce an attention-value representation based on a previous probability representation, a previous value buffer representation, a first change in the probability representation, and a second change in the value buffer representation.

15. The method of claim 1, wherein the first transformer operation comprises a multilayer perceptron.

16. A system for processing frame data, the system comprising:
a processor; and
a memory having stored thereon a set of instructions which, when executed by the processor, cause the processor to:
obtain a sequence of data, the sequence comprising at least a first frame;
apply the sequence of data to a machine learning model, the machine learning model configured to:
determine at least one token-level error based on a difference between at least one token of a first representation, corresponding to the first frame, and a second representation, the first representation comprising a plurality of first tokens;

select a token subset of the first representation based on the at least one token-level error;

perform a first transformer operation based on the token subset to produce an output representation corresponding to the token subset;

scatter the output representation to a buffer representation corresponding to the first representation; and produce a machine learning output score based on the buffer representation; and provide an inference result based on the machine learning output score from the machine learning model.

17. The system of claim 16, wherein the second representation comprises a reference representation, and wherein the machine learning model is configured to determine the token-level error by the difference between corresponding tokens of the first representation and the reference representation.

18. The system of claim 16, wherein the sequence of data further comprises a second frame, the first frame being subsequent to the second frame in time order, wherein the second representation corresponds to the second frame, wherein the machine learning model is configured to determine the token-level error by adding corresponding values from a residual error representation to the difference between corresponding tokens of the first representation and the second representation, and wherein the residual error representation comprises an accumulated error representation of previous frames of the sequence of data.

19. The system of claim 16, wherein the machine learning model is further configured to generate a binary mask based on one or more token-level errors that exceed a threshold, wherein the machine learning model is configured to select the token subset based on the binary mask, and wherein the machine learning model is configured to update a reference representation according to the binary mask.

20. The system of claim 16, wherein the first transformer operation comprises a linear transform to produce the output representation, the output representation comprising a query output representation, a key output representation, and a value output representation, each of the query output representation, the key output representation, and the value output representation corresponding to the token subset, and wherein the buffer representation comprises a query buffer representation scattered from the query output representation, a key buffer representation corresponding the key output representation, and a value buffer representation corresponding to the value output representation.

\* \* \* \* \*